(12) United States Patent
Imamura et al.

(10) Patent No.: US 7,222,878 B2
(45) Date of Patent: May 29, 2007

(54) OCCUPANT PROTECTION APPARATUS

(75) Inventors: Kenji Imamura, Toyota (JP); Junichi Nakano, Toyota (JP); Shigeru Hoshino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 446 days.

(21) Appl. No.: 10/488,274

(22) PCT Filed: Feb. 19, 2003

(86) PCT No.: PCT/JP03/01746

§ 371 (c)(1),
(2), (4) Date: Mar. 1, 2004

(87) PCT Pub. No.: WO03/078213

PCT Pub. Date: Sep. 25, 2003

(65) Prior Publication Data

US 2004/0195811 A1    Oct. 7, 2004

(30) Foreign Application Priority Data

Mar. 20, 2002    (JP) ............. 2002-077786

(51) Int. Cl.
*B60R 21/16*    (2006.01)
(52) U.S. Cl. ............. 280/731; 280/735; 280/777
(58) Field of Classification Search ............ 280/731, 280/777, 735
See application file for complete search history.

(56) References Cited

U.S. PATENT DOCUMENTS 5,295,712 A    3/1994    Omura
5,413,378 A *    5/1995    Steffens et al. ............. 280/735
6,296,280 B1 *    10/2001    Struble et al. ............. 280/777
6,652,000 B2 *    11/2003    Pajon ............. 280/735
6,767,029 B2 *    7/2004    Jaudouin et al. ............. 280/735
6,986,529 B2 *    1/2006    Fischer ............. 280/735
2002/0011724 A1    1/2002    Satou et al.

FOREIGN PATENT DOCUMENTS

| JP | A 58-36761 | 3/1983 |
|---|---|---|
| JP | A 2-216343 | 8/1990 |
| JP | A 4-66369 | 3/1992 |
| JP | A 4-300776 | 10/1992 |
| JP | A 5-42043 | 6/1993 |
| JP | A 5-162646 | 6/1993 |
| JP | B2 2596200 | 1/1997 |
| JP | B2 2776102 | 5/1998 |
| JP | A 2001-504772 | 4/2001 |
| JP | A 2002-67979 | 3/2002 |
| JP | A 2002-67980 | 3/2002 |
| JP | A 2002-79944 | 3/2002 |
| JP | A 2002-137743 | 5/2002 |
| WO | WO 98/22325 | 5/1998 |

* cited by examiner

*Primary Examiner*—Eric Culbreth
(74) *Attorney, Agent, or Firm*—Oliff & Berridge, PLC

(57) ABSTRACT

An occupant protection apparatus includes an air bag device 20 for deploying an air bag between a steering wheel 11 and an occupant H and an impact-energy-absorption-type steering column 12 equipped with an energy-absorbing mechanism 30, and absorbs impact energy of the occupant H during a vehicle collision event. Both the air bag device 20 and the energy-absorbing mechanism 30 are of a variable energy absorption load type. When their energy absorption loads are varied, the energy absorption loads change in the same direction.

7 Claims, 4 Drawing Sheets

OCCUPANT PROTECTION APPARATUS

TECHNICAL FIELD

The present invention relates to an occupant protection apparatus mounted in a vehicle and adapted to protect an occupant of the vehicle during a vehicle collision event through absorption of impact energy of the occupant.

BACKGROUND ART

Occupant protection apparatus of this kind include an air bag device for deploying an air bag between a steering wheel and an occupant, an impact-energy-absorption-type steering column, and a combination of the air bag device and the impact-energy-absorption-type steering column. Another occupant protection apparatus includes an air bag device incorporated in a steering wheel and an actuator for moving forward a steering column with appropriate timing in accordance with a forward movement of a driver during a vehicle collision event so as to lessen a load that is imposed on the driver when the driver interferes with the air bag incorporated in the steering wheel (Japanese Patent No. 2596200).

Conventionally, an energy absorption load; i.e., a load to be imposed on an occupant, is set such that the impact energy of the occupant can be absorbed in relation to a working stroke for energy absorption. However, when the working stroke for energy absorption cannot be set long because of restrictions on the mounting space of the vehicle, the energy absorption load is set higher as compared with the case where the working stroke can be set long. Therefore, when collision conditions and the occupant's physique are taken into consideration, the energy absorption load becomes excessively high; thus, from the viewpoint of the quantity of energy absorption by an air bag device and an impact-energy-absorption-type steering column, the working stroke may be unnecessarily long and thus fails to be effectively exploited (when the impact energy of an occupant is small, such an insufficient exploitation of the working stroke arises). Further, setting the energy absorption load to an increased level means that the load imposed on an occupant becomes high. If energy can be absorbed while the occupant is supported with load of a slightly lower level, impact energy can be effectively absorbed while the occupant is subjected to a gentler load.

DISCLOSURE OF THE INVENTION

In view of the foregoing, an object of the present invention is to effectively absorb the impact energy of an occupant under a gentle energy absorption load; i.e., while supporting the occupant by means of a gentle load, during a vehicle collision event.

An occupant protection apparatus according to the present invention comprises an air bag device for deploying an air bag between a steering wheel and an occupant, and an impact-energy-absorption-type steering column, and the occupant protection apparatus absorbs impact energy of the occupant during a vehicle collision event. The air bag device and the impact-energy-absorption-type steering column are of a variable energy absorption load type. When the energy absorption loads of the air bag device and the impact-energy-absorption-type steering column are varied, the energy absorption loads are varied in the same direction. The energy absorption loads may be varied stepwise or continuously.

The above configuration yields, for example, the following effect: when a vehicle speed upon occurrence of a vehicle collision; i.e., a collision speed, is higher than an assumed value, the energy absorption loads of the air bag device and the impact-energy-absorption-type steering column can be varied in the same increasing direction; and when the collision speed is lower than the assumed value, the energy absorption loads of the air bag device and the impact-energy-absorption-type steering column can be varied in the same decreasing direction.

Thus, as compared with the case where at least either the energy absorption load of the air bag device or that of the impact-energy-absorption-type steering column is constant; i.e., where at least either the air bag device or the impact-energy-absorption-type steering column is of a fixed energy absorption load type, impact energy can be effectively absorbed while an energy absorption load imposed on an occupant is suppressed to a low value. This effect can be attained without need to increase the working stroke of the air bag device and that of the impact-energy-absorption-type steering column, so that the easiness of mounting of the air bag device and the impact-energy-absorption-type steering column onto the vehicle is not impaired.

The present invention may be embodied in such a manner that the energy absorption loads of the air bag device and the impact-energy-absorption-type steering column are set low when an occupant wears his/her seat belt, and are set high when the occupant does not wear his/her seat belt. In this case, since the energy absorption loads of the air bag device and the impact-energy-absorption-type steering column are set low when the occupant wears his/her seat belt, and are set high when the occupant does not wear his/her seat belt, the impact energy of the occupant can be reliably absorbed regardless of whether the occupant's seat belt is fastened, thereby reliably protecting the occupant.

Further, the present invention is preferably embodied in such a manner that the steering wheel comprises energy-absorbing means for absorbing impact energy. In this case, since the steering wheel itself has the energy-absorbing means for absorbing impact energy, as compared with the case where the steering wheel does not have the energy-absorbing means, the air bag device and the impact-energy-absorption-type steering column can be reduced in size, and the easiness of mounting of the air bag device and the impact-energy-absorption-type steering column onto the vehicle is improved.

Moreover, the present invention may be embodied in such a manner that, in the case of a condition under which the energy absorption loads are set low, at least one of the air bag device, the impact-energy-absorption-type steering column, and the energy-absorbing means is selected to absorb impact energy.

BEST MODE FOR CARRYING OUT THE INVENTION

Figure 1:
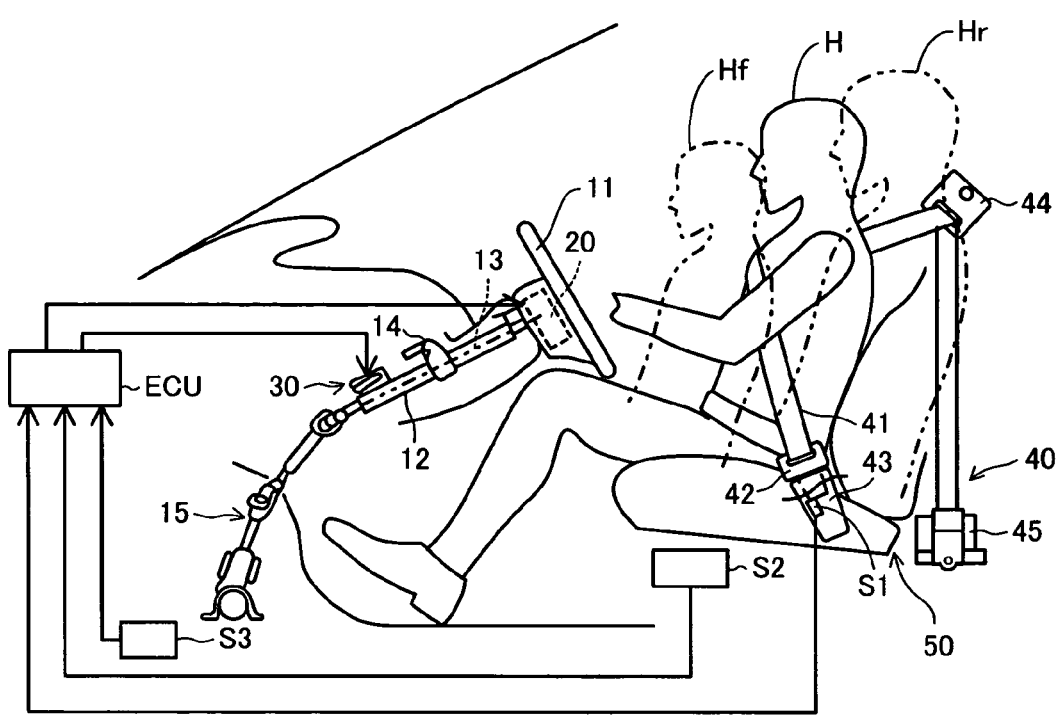
FIG. 1 is a side view schematically showing one embodiment of an occupant protection apparatus according to the present invention.

An embodiment of the present invention will next be described with reference to the drawings. FIGS. 1 to 6 show an occupant protection apparatus according to the present invention. The occupant protection apparatus includes an air bag device 20 incorporated in a steering wheel 11; an energy-absorbing mechanism 30 mounted between a steering column 12 and a vehicle body (not shown); and a seat belt device 40 mounted between a seat 50 and the vehicle body. The occupant protection apparatus is adapted to absorb impact energy of a driver H during a front collision event of the vehicle.

The steering wheel 11 is attached to a rear end portion of a steering shaft 13 in a manner unitarily rotatable with the steering shaft 13, which is attached to the steering column 12 in a rotatable and axially immovable manner. The steering wheel 11 includes a mechanical energy-absorbing means (the impact energy of the driver is absorbed by means of plastic deformation of the steering wheel itself). A rear portion of the steering column 12 is supported by a portion of the vehicle body (not shown) via an upper support bracket 14, and a front portion of the steering column 12 is supported by a portion of the vehicle body via the energy-absorbing mechanism 30.

A front end portion of the steering shaft 13 is connected to a steering link mechanism 15. The upper support bracket 14 is attached to a portion of the vehicle body and supports the steering column 12 in a frontward breakaway manner. When a predetermined load acts on the steering column 12 toward the front of the vehicle, the upper support bracket 14 allows the steering column 12 to break away and move frontward.

The air bag device 20 includes an air bag body (not shown), which is accommodated within the steering wheel 11 in a folded condition, and a pair of inflators (not shown) capable of supplying gas to the air bag body and whose gas supply timing is controlled by an electric control unit ECU. During a front collision event of the vehicle, the air bag body that is inflated and deployed between the driver H and the steering wheel 11 receives the driver H, thereby absorbing the impact energy of the driver H. In the air bag device 20, the electric control unit ECU controls the timing of supplying gas by means of the paired inflators, whereby an energy absorption load is continuously adjustable, or variable.

Figure 2:
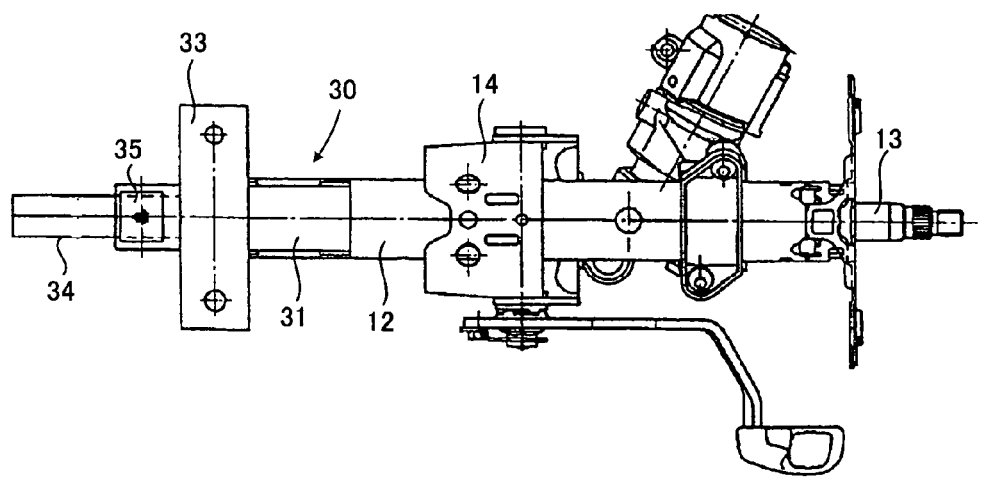
FIG. 2 is a plan view schematically showing a steering apparatus shown in FIG. 1.
Figure 3:
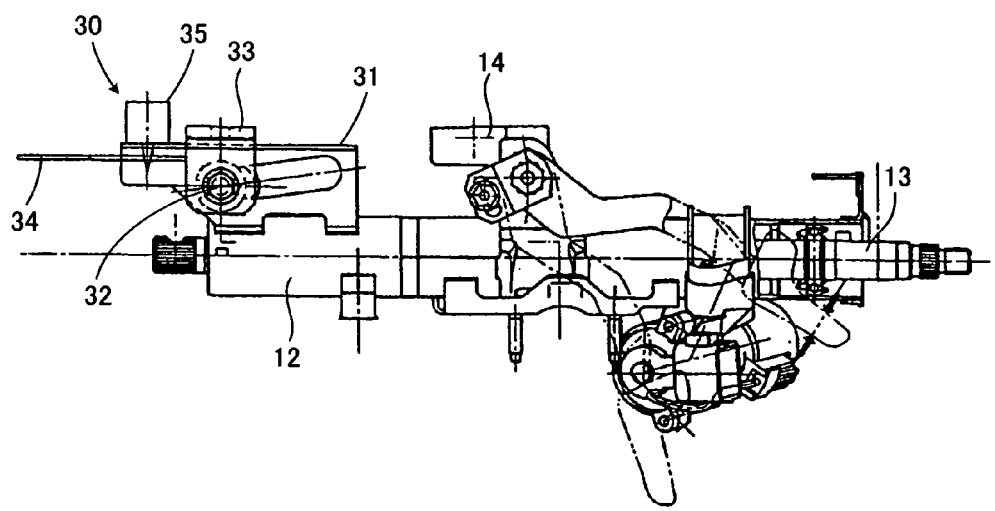
FIG. 3 is a side view of the steering apparatus shown in FIG. 2.
Figure 4:
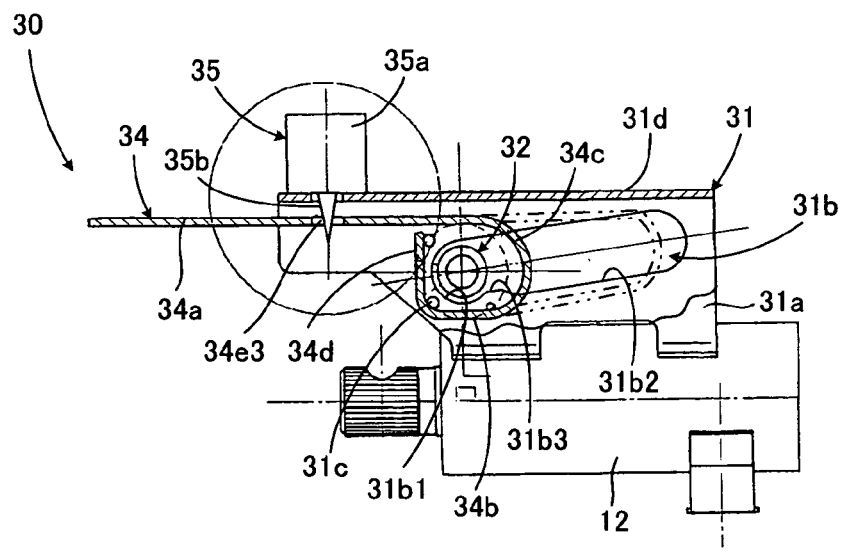
FIG. 4 is a vertical sectional side view showing a main portion of FIG. 3.

The energy-absorbing mechanism 30 also serves as a support mechanism for supporting a front portion of the steering column 12 and includes, as shown in FIGS. 2 to 4, a support bracket 31; a support pin 32; a lower support bracket 33; a curved plate 34, which serves as an energy-absorbing member; and an engagement device 35, which serves as a deformation-characteristic-varying means.

The support bracket 31 assumes a portal shape as viewed from its front or rear side and is fixedly attached to the steering column 12 such that lower end portions of two mutually facing side wall portions 31a are fixed on an upper circumferential portion of the steering column 12. An elongated hole 31b is formed in each of the two side wall portions 31a of the support bracket 31 in such a manner as to extend obliquely upward toward the rear side from a central region of the side wall portion 31a and such that the two elongated holes 31b face each other. Each of the elongated holes 31b consists of a circular hole portion 31b1, which serves as a proximal end portion; a straplike hole portion 31b2, which extends obliquely upward toward the rear side from the circular hole portion 31b1; and a narrow-width portion 31b3, which connects the circular hole portion 31b1 and the straplike hole portion 31b2. The straplike hole portion 31b2 has a width substantially equal to the diameter of the circular hole portion 31b1.

The support pin 32 is attached to the lower support bracket 33, which is fixedly attached to a portion of the vehicle body, while extending through the elongated holes 31b of the support bracket 31. While being attached to the lower support bracket 33, the support pin 32 supports a front end portion of the steering column 12 to a portion of the vehicle body via the support bracket 31 such that the steering column 12 is rotatable along a vertical plane. In the condition shown in FIGS. 3 and 4, the support pin 32 is inserted in the circular hole portions 31b1 of the respective elongated holes 31b of the support bracket 31. In response to a movement of the support bracket 31 relative to the support pin 32, the position of the support pin 32 relative to the support bracket 31 can move rearward beyond the narrow-width portions 31b3 and along the straplike hole portions 31b2.

The curved plate 34 is formed of a plate having a predetermined width by curving a rear end portion of the plate by about 360 degrees and includes an upper wall portion 34a, a lower wall portion 34b, an arcuate wall portion 34c, and an upright wall portion 34d. The upper and lower wall portions 34a and 34b face each other while a predetermined distance is maintained therebetween. The arcuate wall portion 34c connects the rear ends of the upper and lower wall portions 34a and 34b together. The upright wall portion 34d stands vertically from the front end of the lower wall portion 34b.

The curved plate 34 is welded to the support bracket 31 while being positioned by means of a plurality of pins 31c, which are implanted in the side wall portions 31a of the support bracket 31 in such a manner as to surround the circular hole portions 31b1 of the elongated holes 31b. Within the support bracket 31, the curved plate 34 surrounds the support pin 32 as follows: the upright wall portion 34d is located on the front side of the support pin 32; and the arcuate wall portion 34c is located on the rear side of the support pin 32 while extending across the straplike hole portions 31b2 of the elongated holes 31b as viewed from the side of the support bracket 31.

Figure 5:
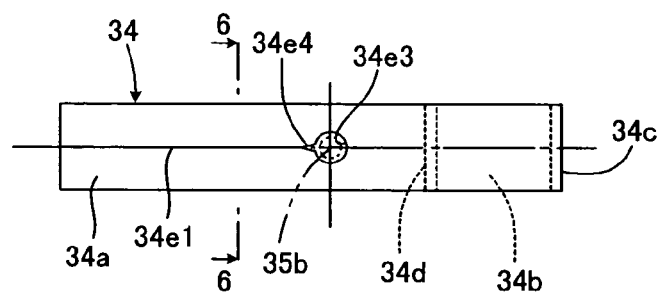
FIG. 5 is a plan view of a curved plate shown in FIG. 4.
Figure 6:
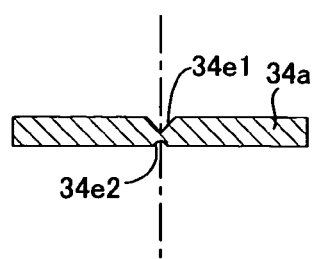
FIG. 6 is an enlarged vertical sectional front view taken along line 6—6 of FIG. 5.

As shown in FIGS. 5 and 6, in the curved plate 34, upper and lower groove portions 34e1 and 34e2 are formed on the upper wall portion 34a in such a manner as to extend longitudinally at a widthwise central portion; a circular engagement hole 34e3 is formed in the upper wall portion 34a at rear end portions of the groove portions 34e1 and 34e2; and a groove 34e4 is formed on the upper wall portion 34a in such a manner as to connect the engagement hole 34e3 to the groove portions 34e1 and 34e2.

The engagement device 35 includes a solenoid 35a and a shear pin 35b, which advances and retreats through control of energization of the solenoid 35a. The solenoid 35a is fixedly attached to a front end portion of an upper wall portion 31d of the support bracket 31. The engagement device 35 is attached to the support bracket 31 such that the shear pin 35b extends through the upper wall portion 31d of the support bracket 31 and faces the engagement hole 34e3 of the upper wall portion 34a of the curved plate 34 in such a manner as to be able to advance and retreat. The shear pin 35b is tapered such that its diameter gradually reduces toward its tip.

In the engagement device 35, the length of projection of the shear pin 35b is continuously adjustable, or variable, through control of current applied to the solenoid 35a by means of the electric control unit ECU, whereby the energy absorption load of the energy-absorbing mechanism 30; i.e., a load generated when the shear pin 35b shears the curved plate 34, can be continuously adjusted. Notably, an energy absorption load that is attained when the support pin 32 draws out and deforms the curved plate 34 is constant and thus invariable, and is generated substantially simultaneously with the event of the shear pin 35b shearing the curved plate 34.

As shown in FIG. 1, the seat belt device 40 includes a seat belt 41; a tongue plate 42; a buckle 43; a shoulder belt anchor 44; and a retractor 45, which contains a pretensioner mechanism and a force limiter mechanism. A switch S1 contained in the buckle 43 detects the presence/absence of the tongue plate 42, thereby detecting whether or not the driver H wears the seat belt 41.

The pretensioner mechanism instantaneously takes up the seat belt 41 at the initial stage of a front collision event of the vehicle so as to firmly restrain the body of the driver H. The force limiter mechanism functions as follows: when, during a front collision event of the vehicle, the driver H moves frontward as a reaction to impact, the mechanism slightly loosens restraint of the seat belt 41 so as to reduce the load imposed on the chest of the driver H to a set load F3.

The electric control unit ECU increases/decreases, in the same direction, the energy absorption loads F1 and F2 of the air bag device 20 and the energy-absorbing mechanism 30 in accordance with the kinetic energy ($E=\frac{1}{2} \cdot M \cdot V^2$) of the driver H, which is calculated on the basis of detection signals from the seating-position sensor S2 and the vehicle speed sensor S3. Specifically, when the kinetic energy E of the driver H is greater than an assumed value, the electric control unit ECU sets, higher than an assumed load Fo, the energy absorption loads F1 and F2 of the air bag device 20 and the energy-absorbing mechanism 30, as represented by the dot-and-dash line in graph (a) of FIG 7. When the kinetic energy E of the driver H is less than the assumed value, the electric control unit ECU sets, lower than the assumed load Fo (but higher than a load F4 that is generated by the energy-absorbing means provided on the steering wheel 11), the energy absorption loads F1 and F2 of the air bag device 20 and the energy-absorbing mechanism 30, as represented by the broken line in graph (a) of FIG. 7.

The electric control unit ECU increases/decreases, in the same direction, the energy absorption loads F1 and F2 of the air bag device 20 and the energy-absorbing mechanism 30 in accordance with the kinetic energy ($E=\frac{1}{2} \cdot M \cdot V^2$) of the driver H, which is calculated on the basis of detection signals from the seating-position sensor S2 and the vehicle speed sensor S3. Specifically, when the kinetic energy E of the driver H is greater than an assumed value, the electric control unit ECU sets, higher than an assumed load Fo, the energy absorption loads F1 and F2 of the air bag device 20 and the energy-absorbing mechanism 30, as represented by the dot-and-dash line in FIG. 7(a). When the kinetic energy E of the driver H is less than the assumed value, the electric control unit ECU sets, lower than the assumed load Fo (but higher than a load F4 that is generated by the energy-absorbing means provided on the steering wheel 11), the energy absorption loads F1 and F2 of the air bag device 20 and the energy-absorbing mechanism 30, as represented by the broken line in FIG. 7(a).

The electric control unit ECU can control the energy absorption loads F1 and F2 of the air bag device 20 and the energy-absorbing mechanism 30 on the basis of a detection signal from the switch Si contained in the buckle 43. Specifically, the energy absorption loads F1 and F2 are set low as shown in graph (a) of FIG. 7 when the driver H wears the seat belt 41, and are set high as shown in FIG. 8 when the driver H does not wear the seat belt 41. In control by the electric control unit ECU, in order to trigger the operation of the air bag device 20 simultaneously with or prior to the operation of the energy-absorbing mechanism 30, the energy absorption load F2 of the energy-absorbing mechanism 30 is set equal to or higher than the energy absorption load F1 of the air bag device 20 (F2≧F1).

Figure 7:
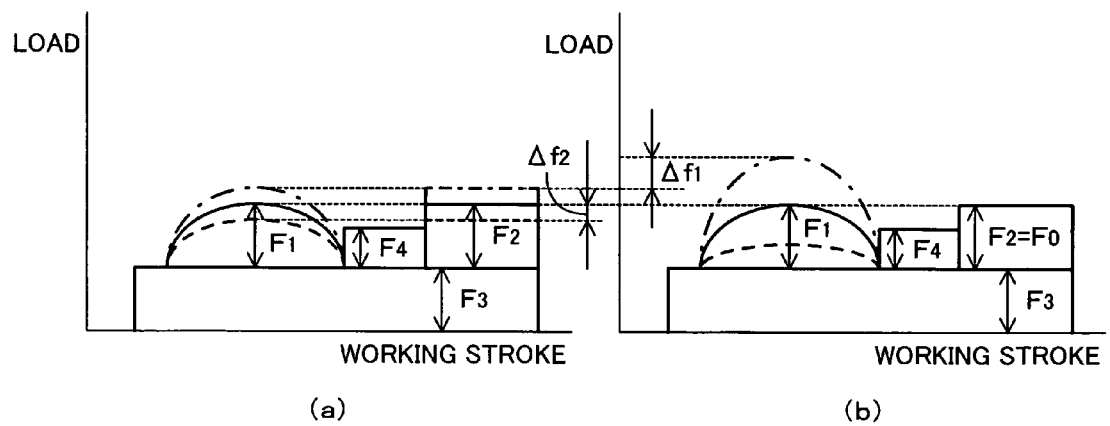
FIG. 7 is a pair of schematic performance diagrams showing performance during a front collision event of a vehicle under the condition that a seat belt is fastened.
Figure 8:
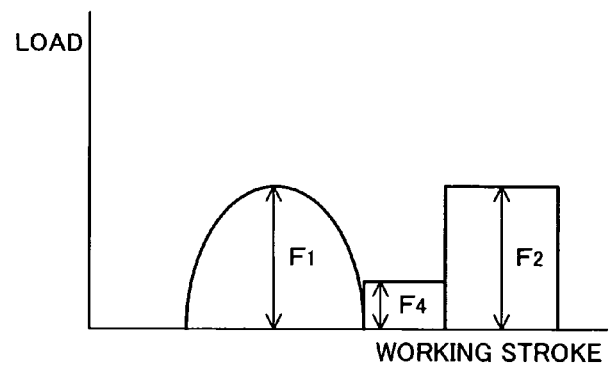
FIG. 8 is a schematic performance diagram showing performance during a front collision event of a vehicle under the condition that a seat belt is not fastened.

In operation of the thus-configured embodiment, during a front collision event of the vehicle under a condition of the driver H wearing the seat belt 41, as the chest of the driver H moves, the seat belt device 40 functions, and also the air bag device 20 incorporated in the steering wheel 11, the mechanical energy-absorbing means provided on the steering wheel 11, and the energy-absorbing mechanism 30 mounted between the steering column 12 and the vehicle body (not shown) operate sequentially, thereby yielding the performance (energy absorption loads F3, F1, F4, and F2) as schematically shown in graph (a) of FIG. 7 and thus absorbing the impact energy of the driver H.

During a front collision event of the vehicle in a condition of the driver H not wearing the seat belt 41, as the chest of the driver H moves, the air bag device 20 incorporated in the steering wheel 11, the mechanical energy-absorbing means provided on the steering wheel 11, and the energy-absorbing mechanism 30 mounted between the steering column 12 and the vehicle body (not shown) operate sequentially, thereby yielding the performance (energy absorption loads F1, F4, and F2) as schematically shown in FIG. 8 and thus absorbing the impact energy of the driver H.

In the present embodiment, when the kinetic energy of the driver H is greater than an assumed value (for example, when the driver has a physique Hr greater than the standard physique as shown in FIG. 1 or when the vehicle speed V upon occurrence of a front collision of the vehicle is higher than an assumed value), as represented by the dot-and-dash line in graph (a) of FIG. 7, the energy absorption loads F1 and F2 of the air bag device 20 and the energy-absorbing mechanism 30 are set higher than the assumed load Fo (represented by a solid line).

When the kinetic energy of the driver H is less than the assumed value (for example, when the driver has a physique Hf less than the standard physique as shown in FIG. 1 or when the vehicle speed V upon occurrence of a front collision of the vehicle is lower than the assumed value), as represented by the broken line in graph (a) of FIG. 7. the energy absorption loads F1 and F2 of the air bag device 20 and the energy-absorbing mechanism 30 are set lower than the assumed load Fo (represented by a solid line).

Thus, as compared with a typical comparative example (the air bag device 20 is of a variable energy absorption load type, whereas the energy-absorbing mechanism 30 is of a fixed energy absorption load type; i.e., F2=Fo (constant)) schematically shown in graph (b) of FIG. 7, the present embodiment is characterized as follows: in the case where the energy absorption loads F1 and F2 become high as represented by the dot-and-dash line in graph (a) of FIG. 7. the load F1 can be reduced by a load Δf1 shown in FIG. 7;

and in the case where the energy absorption loads F1 and F2 become low as represented by the broken line in graph (a) of FIG. 7, the loads F1 and F2 can be reduced by a load Δf2.

Thus, as compared with the above-mentioned comparative example, in any cases, the present embodiment can effectively absorb impact energy while an energy absorption load that is imposed on the driver H during a vehicle collision event is suppressed to a low value. As shown in FIG. 7, such an effect can be attained without increasing the respective working strokes of the air bag device 20 and the energy-absorbing mechanism 30, so that the easiness of mounting of the air bag device 20 and the energy-absorbing mechanism 30 onto the vehicle is not impaired.

As compared with another comparative example in which the air bag device 20 is of a fixed energy absorption load type; i.e., F1=Fo (constant), for a reason similar to that described above, in any cases, the present embodiment can effectively absorb impact energy while an energy absorption load that is imposed on the driver H during a vehicle collision event is suppressed to a low value. As compared with a further comparative example in which both of the air bag device 20 and the energy-absorbing mechanism 30 are of a fixed energy absorption load type; i.e., F1=F2=Fo (constant), the present embodiment is characterized as follows: in the case where the energy absorption loads F1 and F2 become low as represented by the broken line in graph (a) of FIG. 7, the loads F1 and F2 can be reduced by the load Δf2.

According to the present embodiment, the energy absorption loads F1 and F2 of the air bag device 20 and the energy-absorbing mechanism 30 are set low as schematically shown in graph (a) of FIG. 7 when the driver H wears the seat belt 41; and the energy absorption loads F1 and F2 are set high as schematically shown in FIG. 8 when the driver H does not wear the seat belt 41 (the energy absorption loads F1 and F2 of the air bag device 20 and the energy-absorbing mechanism 30 are increased so as to compensate the loss of the energy absorption load F3, which could otherwise be generated by the seat belt 41, resulting from a failure to fasten the seat belt 41). Thus, regardless of whether the seat belt 41 is fastened, the impact energy of the driver H is reliably absorbed, whereby the driver H can be reliably protected.

Additionally, in the present embodiment, the mechanical energy-absorbing means is provided on the steering wheel 11 and can cooperatively absorb the impact energy of the driver H (the energy absorption load F4 can be obtained). Thus, as compared with the case where the steering wheel 11 is not provided with the energy-absorbing means, the air bag device 20 and the energy-absorbing mechanism 30 can be reduced in size (the energy absorption capability can be set to a lower level) and thus the easiness of mounting of the device and mechanism onto the vehicle is improved.

According to the above-described embodiment, the energy absorption loads F1 and F2 of the air bag device 20 and the energy-absorbing mechanism 30 are varied continuously in the same direction in accordance with the kinetic energy of the driver H. However, the present invention can be embodied as follows: the energy absorption loads F1 and F2 of the air bag device 20 and the energy-absorbing mechanism 30 are varied stepwise in the same direction in accordance with the kinetic energy of the driver H.

According to the above-described embodiment, during a front collision event of the vehicle, both of the air bag device 20 and the energy-absorbing mechanism 30 operate. However, the present invention can be embodied as follows: when the kinetic energy of the driver is small (for example, when the vehicle speed upon occurrence of a front collision of a vehicle is lower than a set value), for example, only the air bag device 20, only the energy-absorbing mechanism 30, or only the mechanical energy-absorbing means provided on the steering wheel 11 operates. In such a case, the vehicle can be readily repaired.

According to the above-described embodiment, the energy absorption loads F1 and F2 of the air bag device 20 and the energy-absorbing mechanism 30 are increased/decreased in the same direction in accordance with the kinetic energy ($E=\frac{1}{2} \cdot M \cdot V^2$) of the driver H that is calculated on the basis of detection signals from the seating-position sensor S2 and the vehicle speed sensor S3. However, the present invention can be embodied, for example, as follows: the energy absorption loads F1 and F2 of the air bag device 20 and the energy-absorbing mechanism 30 are increased/decreased in the same direction in accordance with the kinetic energy ($E=\frac{1}{2} \cdot M \cdot V^2$) of the driver H that is calculated on the basis of a detection signal from the vehicle speed sensor S3 while the weight (M) of the driver H is assumed to be constant. Alternatively, the energy absorption loads F1 and F2 can be increased/decreased in accordance with a detection value from a G sensor, a vehicle speed sensor, or a like sensor, or in accordance with the result of calculation performed on the combination of such detection values.

The above-described embodiment employs the air bag device 20 incorporated in the steering wheel 11. However, the air bag device for use in the present invention is not limited to the air bag device 20 of the above embodiment, but may be configured in any form so long as an air bag that is inflated and deployed between the steering wheel and an occupant is provided. According to the above-described embodiment, the steering column 12 and the energy-absorbing mechanism 30 constitute an impact-energy-absorption-type steering column. However, the impact-energy-absorption-type steering column for use in the present invention is not limited thereto. For example, an energy-absorbing mechanism may be incorporated in a steering column itself.

The invention claimed is:

1. An occupant protection apparatus, comprising:
   an air bag device for deploying an air bag between a steering wheel and an occupant; and
   an impact-energy-absorption steering column,
   wherein energy absorption loads of the air bag device and the impact-energy-absorption steering column are varied;
   and when the energy absorption loads of the air bag device and the impact-energy-absorption steering column are varied, the energy absorption loads are varied in the same direction in such a manner that the energy absorption load of the impact-energy-absorption steering column is maintained equal to or greater than the energy absorption load of the air bag device.

2. An occupant protection apparatus according to claim 1, wherein both the energy absorption loads of the air bag device and the impact-energy-absorption steering column are set to first values when the occupant wears a seat belt, and set to second values when the occupant does not wear the seat belt, the second values being higher than the first values.

3. An occupant protection apparatus according to claim 2, wherein the steering wheel comprises energy-absorbing means for absorbing impact energy.

4. An occupant protection apparatus according to claim 3, wherein, in the case of a condition under which the energy absorption loads are set to the first values, at least one of the air bag device, the impact-energy-absorption steering column, and the energy-absorbing means is selected to absorb impact energy.

5. An occupant protection apparatus according to claim 2, wherein, in the case of a condition under which the energy absorption loads are set to the first values, at least one of the air bag device and the impact-energy-absorption steering column is selected to absorb impact energy.

6. An occupant protection apparatus according to claim 1, wherein the steering wheel comprises energy-absorbing means for absorbing impact energy.

7. An occupant protection apparatus according to claim 1, wherein, in the case of a condition under which the energy absorption loads are set to first values, at least one of the air bag device and the impact-energy-absorption steering column is selected to absorb impact energy.

* * * * *